(12) United States Patent
Duffin et al.

(10) Patent No.: US 12,336,460 B2
(45) Date of Patent: *Jun. 24, 2025

(54) IRRIGATION SADDLE ANNULAR SEAL FACE

(71) Applicant: XCAD VALVE AND IRRIGATION, INC., Paul, ID (US)

(72) Inventors: Don D. Duffin, Paul, ID (US); Roger M. Duffin, Paul, ID (US)

(73) Assignee: Xcad Valve & Irrigation, Inc., Rupert, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/888,902

(22) Filed: Sep. 18, 2024

(65) Prior Publication Data
US 2025/0008890 A1  Jan. 9, 2025

Related U.S. Application Data

(63) Continuation of application No. 15/925,622, filed on Mar. 19, 2018.

(60) Provisional application No. 62/472,698, filed on Mar. 17, 2017.

(51) Int. Cl.
*F16L 41/02*    (2006.01)
*A01G 25/02*    (2006.01)
*F16L 47/34*    (2006.01)

(52) U.S. Cl.
CPC .......... *A01G 25/023* (2013.01); *F16L 41/021* (2013.01); *F16L 47/345* (2013.01)

(58) Field of Classification Search
CPC ....... F16L 41/02; F16L 41/021; F16L 47/345; F16L 19/06; F16L 19/061; F16L 19/065; F16L 19/0653; F16L 19/07; F16L 21/03; F16L 21/035; F16L 21/05; F16L 21/02; F16L 17/02; F16L 17/06; F16L 17/00; F16L 17/067
USPC ................ 285/133.11, 133.21, 133.3, 133.4; 239/200, 201, 288
See application file for complete search history.

(56) References Cited

U.S. PATENT DOCUMENTS

| | | | |
|---|---|---|---|
| 2,376,412 A | 5/1945 | Authur | |
| 5,868,443 A | 2/1999 | Ungerman et al. | |
| 6,302,445 B1 | 10/2001 | Kungele et al. | |
| 6,357,802 B1 | 3/2002 | Nozato | |
| 7,806,382 B1 * | 10/2010 | Palumbo | G05D 16/2095 |
| | | | 251/30.01 |
| D673,244 S | 12/2012 | Magargal et al. | |
| 8,459,698 B2 | 6/2013 | Magargal et al. | |
| 2006/0065306 A1 | 3/2006 | Mortensen | |
| 2012/0161433 A1 | 6/2012 | Magargal et al. | |

(Continued)

*Primary Examiner* — Aaron M Dunwoody
(74) *Attorney, Agent, or Firm* — Shaver Swanson; Scott D. Swanson

(57) ABSTRACT

A pipe coupler having a saddle for connecting to a riser adapter for use in an irrigation system to distribute water. A dynamic seal is positioned in a circumferential channel of the riser adapter on the outer surface of a flange or projection that is positioned into the circular mount of the saddle. In response to water pressure against the dynamic seal, the dynamic seals the connection between the riser adapter and the saddle by sealing against the annular sealing face on the inner circumference of a circular mount of the saddle. The dynamic seal is an O-ring in preferred embodiments.

5 Claims, 9 Drawing Sheets

(56) References Cited

U.S. PATENT DOCUMENTS

2013/0181445 A1  7/2013  Glime et al.

* cited by examiner

IRRIGATION SADDLE ANNULAR SEAL FACE

CROSS-REFERENCE TO RELATED APPLICATIONS

This application claims the benefit of U.S. Non Provisional application Ser. No. 15/925,622, filed Mar. 19, 2018, which claims benefit to U.S. Provisional Application No. 62/472,698, filed Mar. 17, 2017 the disclosure of each of which is incorporated by reference.

FIELD OF THE INVENTION

The presently disclosed technology relates to an irrigation pipe coupler having a saddle for use with a riser adapter. More particularly, the present invention is an irrigation pipe coupler saddle having an annular face and seal for sealing between the riser adapter and saddle, the saddle being fluidly connected to the irrigation pipe coupler.

BACKGROUND OF THE INVENTION

One type of agricultural irrigation system commonly used is a solid set, or fixed grid, system that utilizes movable pipe to provide water to sprinklers spaced throughout all or part of the field. Each pipe contains intermittently spaced pipe couplers with a riser to provide water from the pipe to a sprinkler mounted on top of the riser. Many methods have been used to mount the riser to the pipe coupler more easily to facilitate easier installation and removal, preferably without tools. One more common method is for the pipe coupler to have a pipe coupler saddle ("saddle") fixedly connected to the pipe coupler for separably mounting a riser adapter, to which the riser is fixedly mounted. The saddle and riser adapter allow for water to flow from the pipe coupler to the riser and sprinkler. A seal is required between the saddle and riser adapter to prevent leakage at this point.

One common method for mounting the riser adapter to the saddle utilizes a threaded connection and a seal between faces that are transverse to the flow of water and mounting direction, requiring relatively significant axial force to maintain a leak-free seal. This makes maintaining a leak-free seal, or removal of the riser adapter difficult without tools. What is needed is a method of sealing between a saddle and riser adapter that is easier to install and remove while maintaining a leak-free seal.

SUMMARY

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

What is disclosed is a pipe coupler having a pipe coupler saddle for connection with a riser adapter, as well as a combination of these elements. The pipe coupler being a cylindrical tube having at least one open end configured for connection to an irrigation pipe system. The pipe coupler having a saddle positioned on a top of said pipe coupler. The saddle having a circular mount positioned above an aperture in the wall of the pipe coupler. The aperture is in fluid communication with a central region of said saddle such that water may flow from the irrigation pipe system into the coupler and through the aperture.

The circular mount having an internal annular face, an external annular face, and an end face positioned at the top of the circular mount. The internal annular face provides an annular sealing face free of internal threading. The internal annular face can further include internal (or female) threading. When the internal annular face has threading, the internal annular face is preferably positioned between the threading and the end face of the circular mount.

The riser adapter is threadingly connected to the saddle, either by external threading on the circular mount or internal threading on the circular mount. The riser adapter has a hollow main body that is cylindrical in shape and configured for water flowing through the circular mount to flow through the riser adapter to a sprinkler riser. The hollow main body has an external circumferential surface positioned adjacent to the annular sealing face of the circular mount. The external circumferential surface defines a dedicated circumferential channel.

A dynamic seal is positioned within the dedicated circumferential channel. The dynamic seal is configured such that water flow through the circular mount into the riser adapter causes the O-ring to seal against said annular sealing face, preventing water flow between the annular sealing face and the riser.

The riser adapter can be in the form of a plug or a cap. In the form of a plug the circular mount has internal threading positioned on the internal annular face of the circular mount. Preferably the internal threading is spaced apart from the end face of the circular mount to provide the annular sealing face. The external circumference of the hollow main body of the plug has male threading that threadingly connects to the internal threading of the circular mount to secure the plug to the circular mount.

In a riser adapter and saddle combination in which the riser adapter is a cap, the cap has an annular flange having female threading configured for threaded engagement with male threading on the exterior of said circular mount. The annular flange circumvolves in a spaced apart relationship the external circumferential surface of the hollow main body of the riser adapter. The circular mount is positioned between the annular flange and the external circumferential surface of the hollow main body when the cap is installed on the circular mount. The circular mount having external threading that is threadingly engaged with corresponding threading on an internal threading on said annular flange.

The internal bore of the riser adapter can be smooth and/or threaded for coupling to a sprinkler riser. This allows for riser attachment by threaded attachment or by solvent weld or by some other means.

The saddle can be integral with the pipe coupler or can be removably attached to the pipe coupler, allowing for replacement or substitution of saddles. In an exemplary embodiment the pipe coupler has a pipe coupler flange extending from the pipe coupler in a generally vertical direction and surrounding the aperture. The saddle has a main saddle body with a generally tubular profile and a saddle flange surrounding the main saddle body. The saddle flange is fixedly mounted to said pipe coupler flange, preferably by fasteners such as bolts that provide the ability to remove the saddle. A seal, preferably an o-ring, seals between the saddle and the pipe coupler such that water flows through said aperture through said circular mount of the pipe coupler without leaking out between the saddle and pipe coupler.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

DETAILED DESCRIPTION OF THE INVENTION

Figure 1:
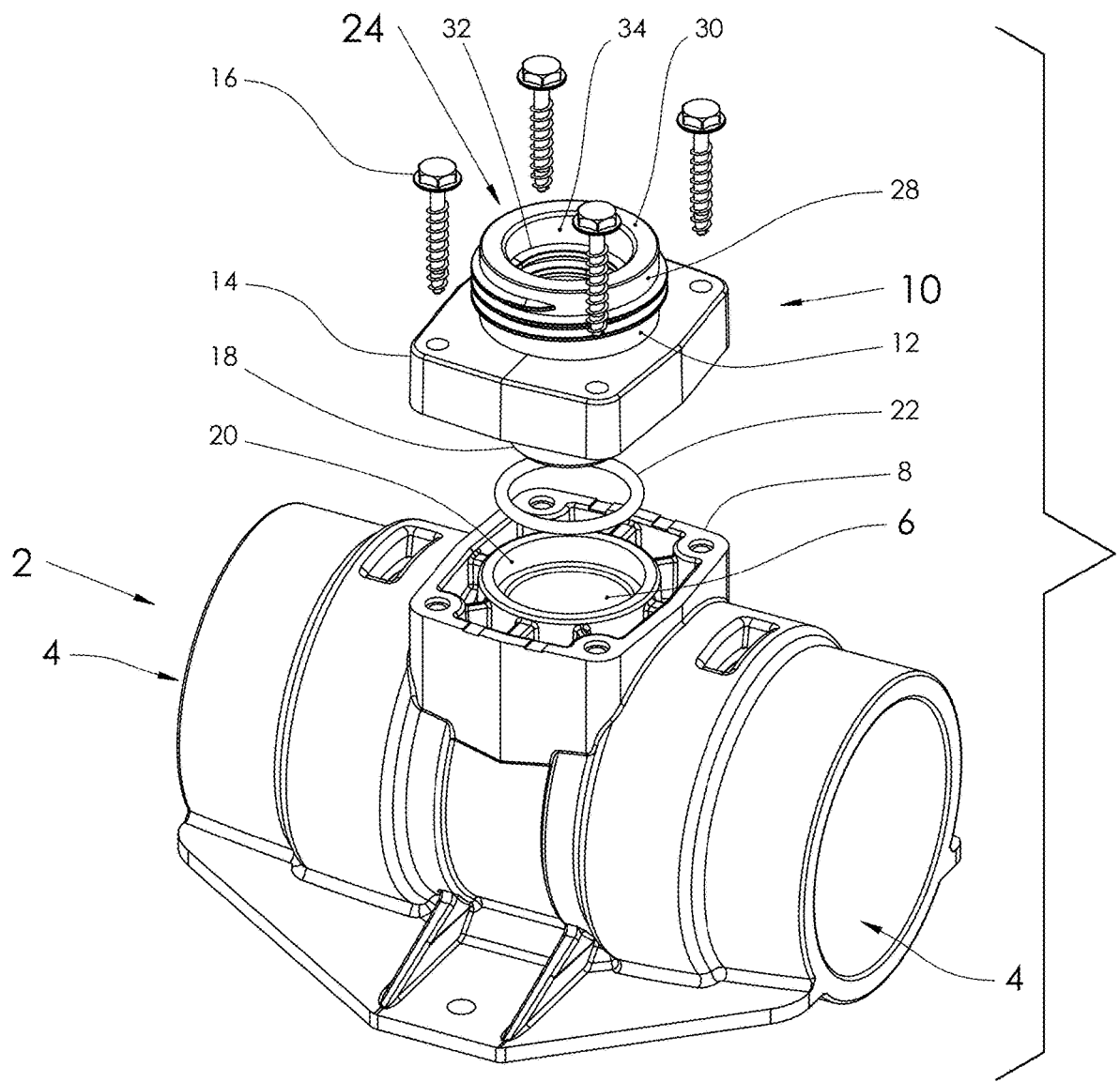
FIG. 1 illustrates an exploded isometric view of a first embodiment of an irrigation saddle.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Figure 2:
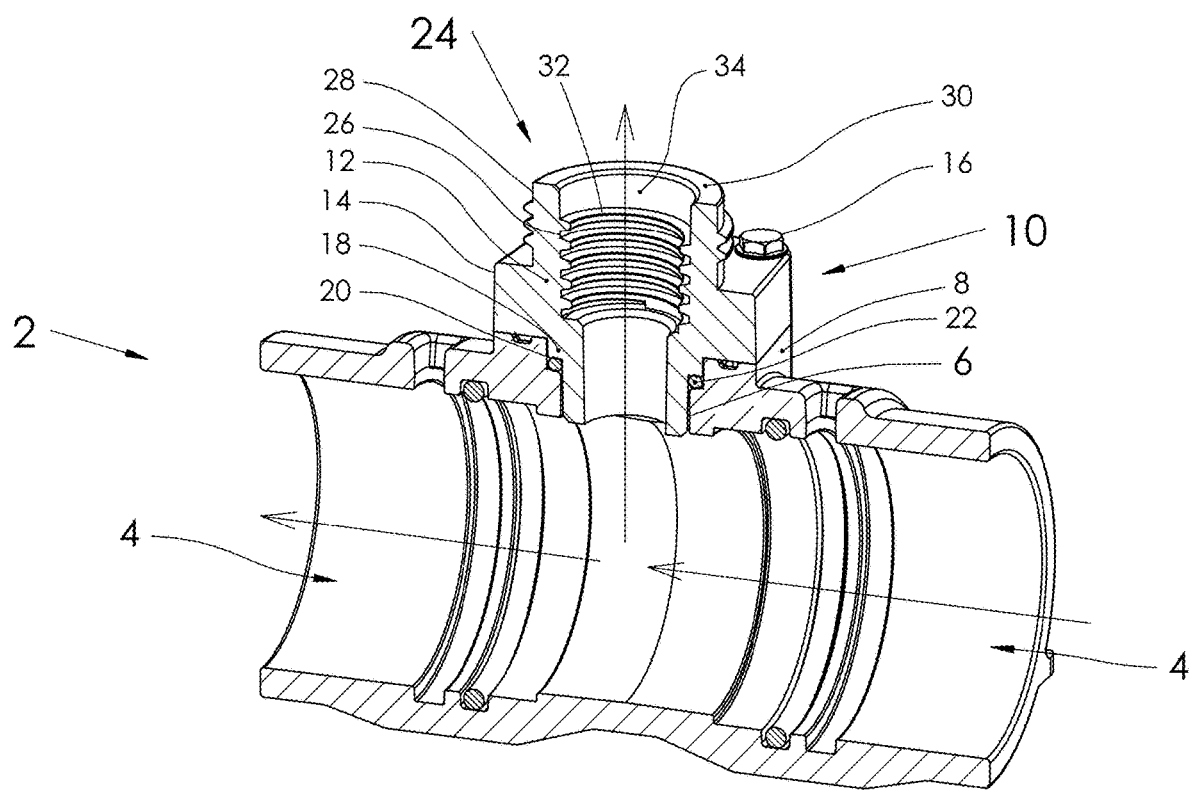
FIG. 2 illustrates an isometric cross-sectional view of a first embodiment of an irrigation saddle.
Figure 3:
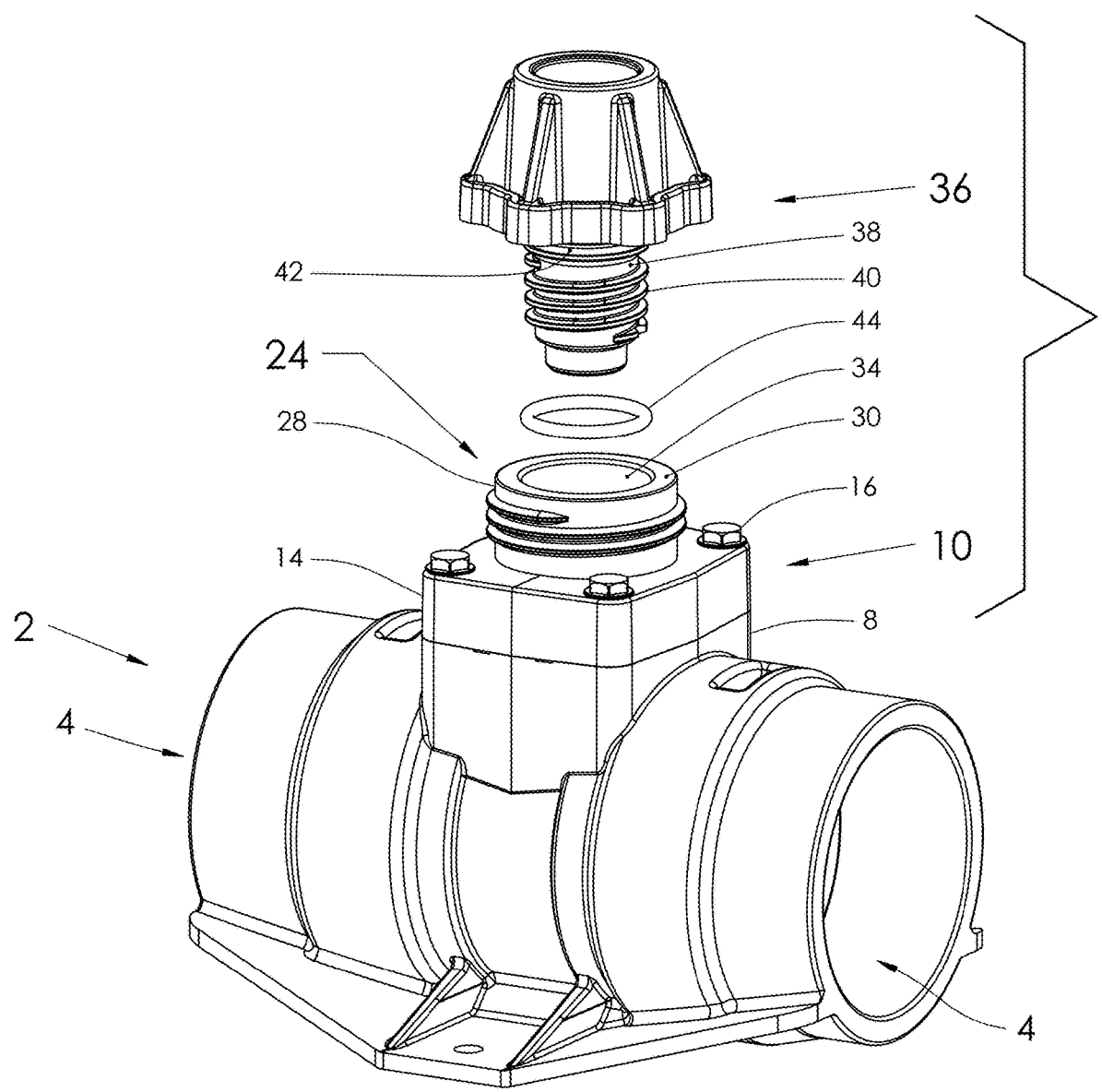
FIG. 3 illustrates an isometric view of a first embodiment of an irrigation saddle with an exploded riser adapter and seal.

FIGS. 1-3 illustrate a first preferred embodiment of a saddle for use with an irrigation pipe coupler. FIG. 1 illustrates an isometric view of a saddle. The pipe coupler 2 is cylindrical and tube-like in structure and has one or more open ends 4 to which irrigation pipe can be connected. The pipe coupler 2 has an aperture 6 generally at the top. In a preferred embodiment, the pipe coupler 2 has a pipe coupler flange 8 extending from the pipe coupler in a generally vertical direction, surrounding aperture 6. A saddle 10 has a main body 12 with a generally tubular profile. In a preferred embodiment the saddle 10 has a saddle flange 14 that is configured to fixedly mount the saddle 10 to the top of the pipe coupler flange 8 by fasteners 16 or other mechanical mechanism. In this embodiment, the saddle main body 12 has a tubular protrusion 18, and the pipe coupler flange 8 has a circular recess 20 into which the tubular protrusion 18 fits, which circular recess 20 aligns with aperture 6. A saddle body seal 22 is configured to mount between the tubular protrusion 18 and annular recess 20 to prevent leakage at this joint.

The saddle main body 12 has a circular mount 24 that is tubular in shape and extends away from the saddle in a roughly perpendicular orientation with respect to the ground. The circular mount 24 is positioned above the aperture 6 providing fluid communication between the pipe coupler 2 and circular mount 24. The circular mount 24 has an internal annular face 26 (FIG. 2), an external annular face 28, and an end face 30 positioned at the top of the circular mount 24. The circular mount 24 has internal threads 32 on the internal annular face 26, spaced away from end face 30 to provide an internal annular sealing face 34. The circular mount 24 is configured to threadedly receive a riser adapter 36 (shown in FIG. 3). Irrigation pipe couplers are typically made from plastic. A mountable saddle can be made of other materials, such as metal, to allow for stronger threads on the circular mount 24, eliminating a weak point on the coupler-riser assembly.

FIG. 2 illustrates an isometric cross-sectional view of the saddle 10 fixedly mounted to the pipe coupler 2. The saddle body seal 22 is shown providing a seal between the tubular protrusion 18 and circular recess 20 to prevent leakage at this joint.

FIG. 3 illustrates an isometric view of the first embodiment of an irrigation saddle 10 of FIGS. 1-2 with an exploded riser adapter 36 and dynamic seal 44. In this first preferred embodiment, the riser adapter 36 has a hollow main body that is cylindrical in shape with a base 38 with external circumferential threading 40. The threaded base 38 is configured to be releasably mounted with the internal threading of the circular mount 24. The riser adapter base 38 also has a circumferential channel 42 on the external annular face above the external circumferential threading 40. The circumferential channel 42 is configured to mount a dynamic seal 44, preferably an O-ring. When the riser adapter 36 is threaded into the saddle circular mount 24, pressure from water flowing from the coupler through the riser adapter causes the dynamic seal 44 to radially seal against the internal annular sealing face 34. The dynamic seal radially seals against the internal annular sealing face 36, which is parallel to the mounting direction of the riser adapter 36. Because of this construction, the dynamic seal seals against the annular sealing face 34 even if the riser adapter 36 is not fully threaded into the circular mount 24. In this way, high axial force is not needed to create a leak-free seal, and the riser adapter 36 can be more easily installed without needing to substantially tighten the riser adapter.

Figure 4:
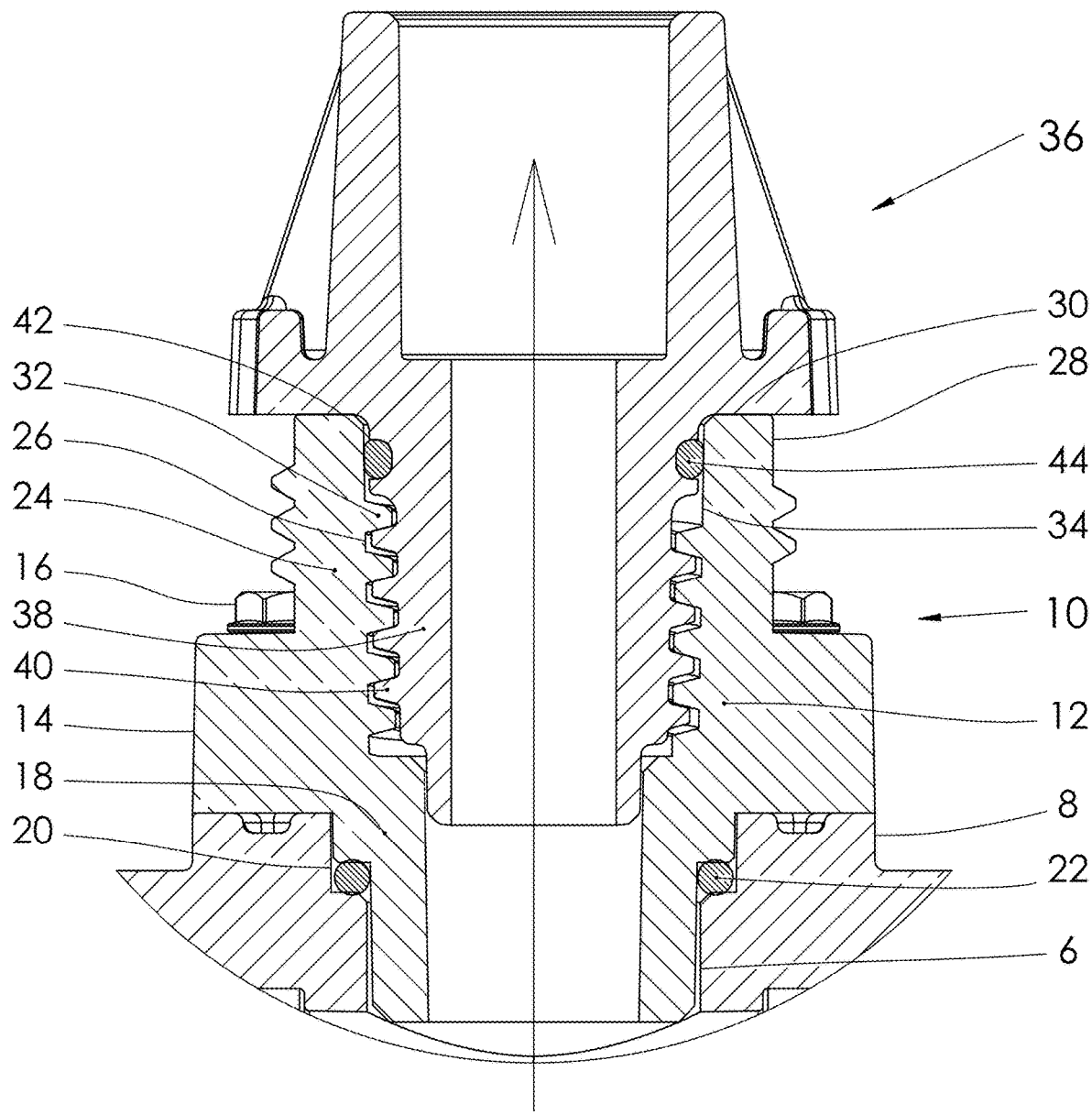
FIG. 4 illustrates a cross-sectional view of a first embodiment of an irrigation saddle with a riser adapter and seal.

FIG. 4 illustrates a cross-sectional view of a first embodiment of an irrigation saddle 10 with a riser adapter 36 fully installed.

Figure 5:
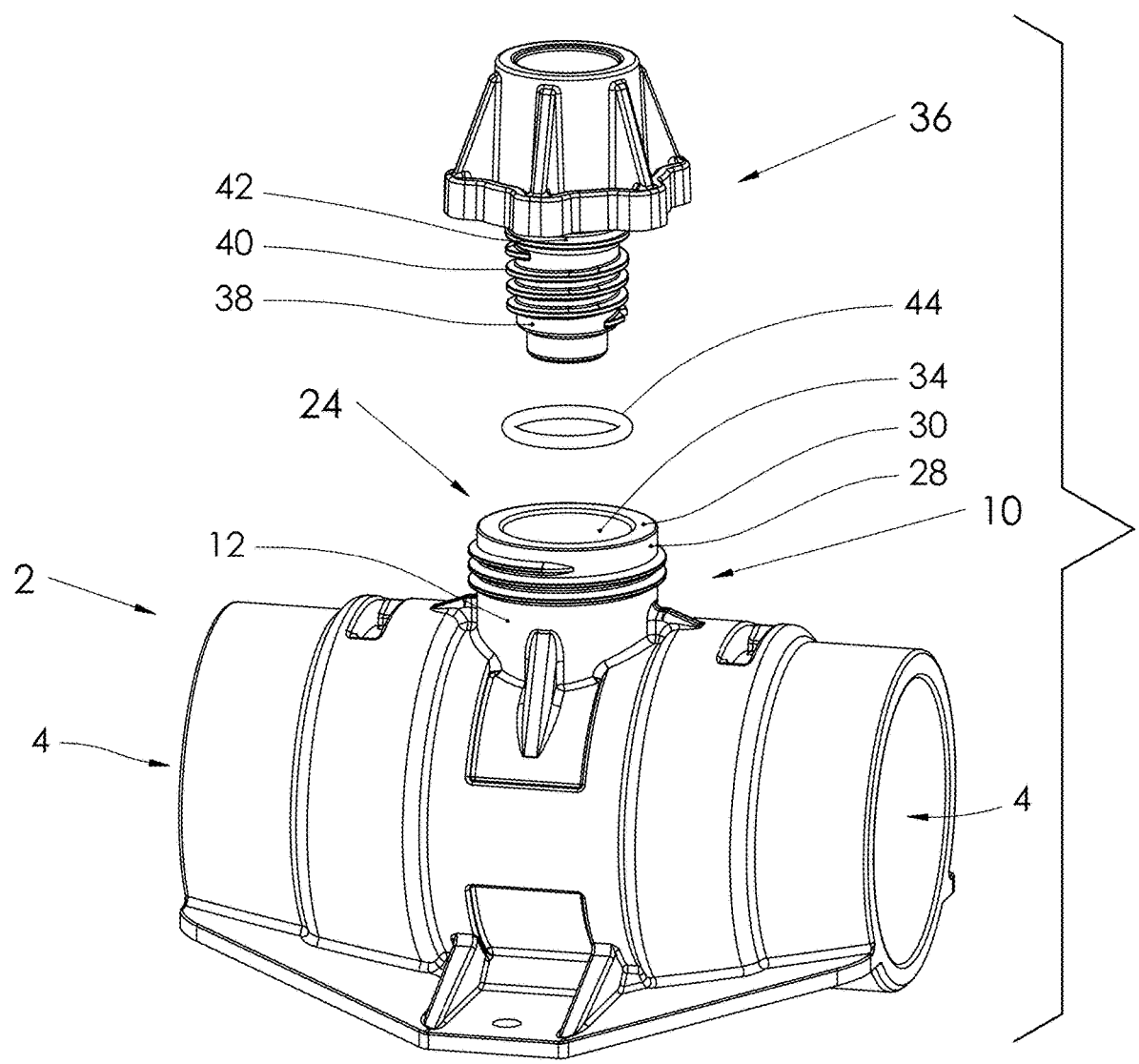
FIG. 5 illustrates an exploded isometric view of a second embodiment of an irrigation saddle with a riser adapter and seal.

FIG. 5 illustrates an exploded isometric view of a second embodiment of an irrigation saddle 10 with a riser adapter 36 and seal 44. In this preferred embodiment, the saddle 10 is integral with the pipe coupler.

Figure 6:
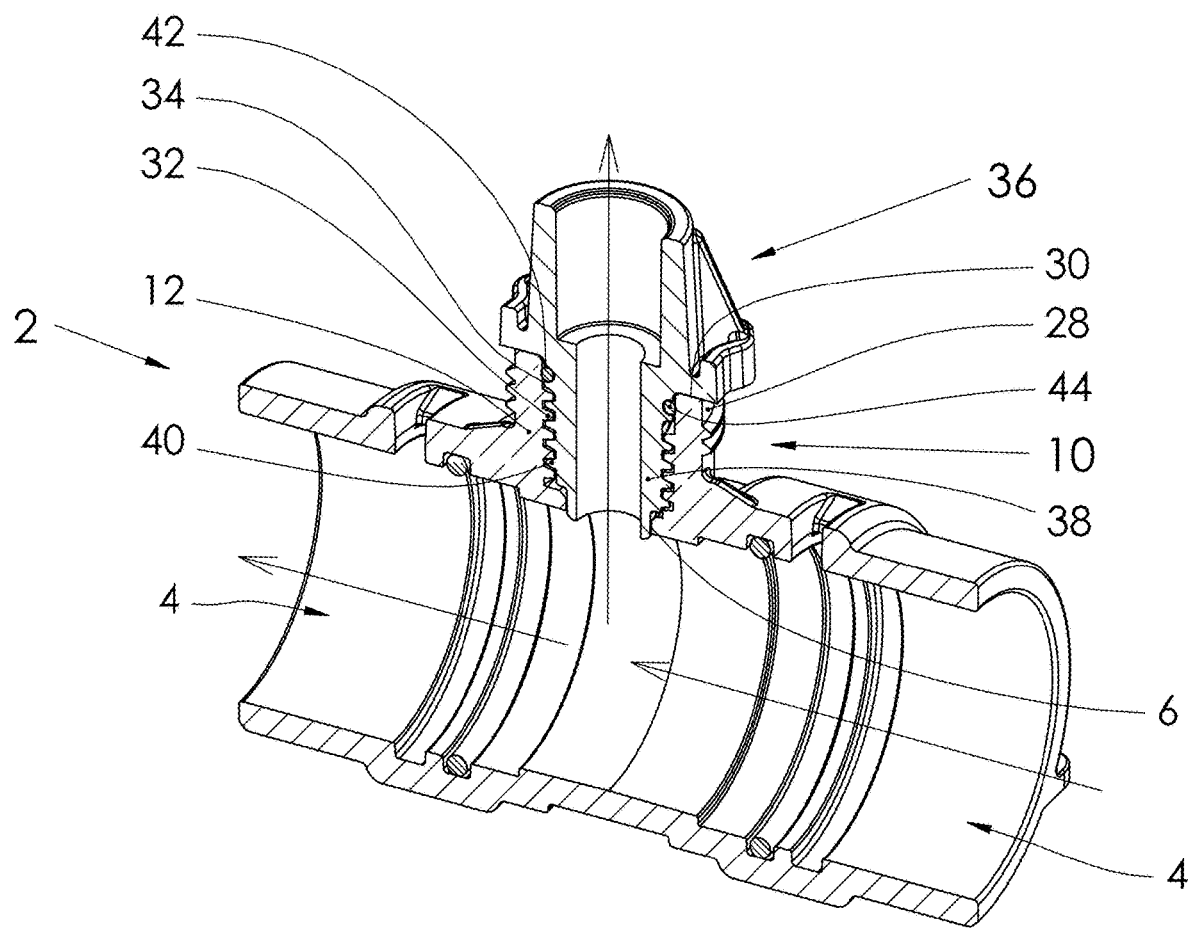
FIG. 6 illustrates an isometric cross-sectional view of a second embodiment of an irrigation saddle with a riser adapter and seal.

FIG. 6 illustrates an isometric cross-sectional view of a second embodiment of an irrigation saddle 10 with a riser adapter 36 and dynamic seal 44 fully installed. In this preferred embodiment, the riser adapter 36 is configured for fixed engagement with the riser by adhesive or some other method.

Figure 7:
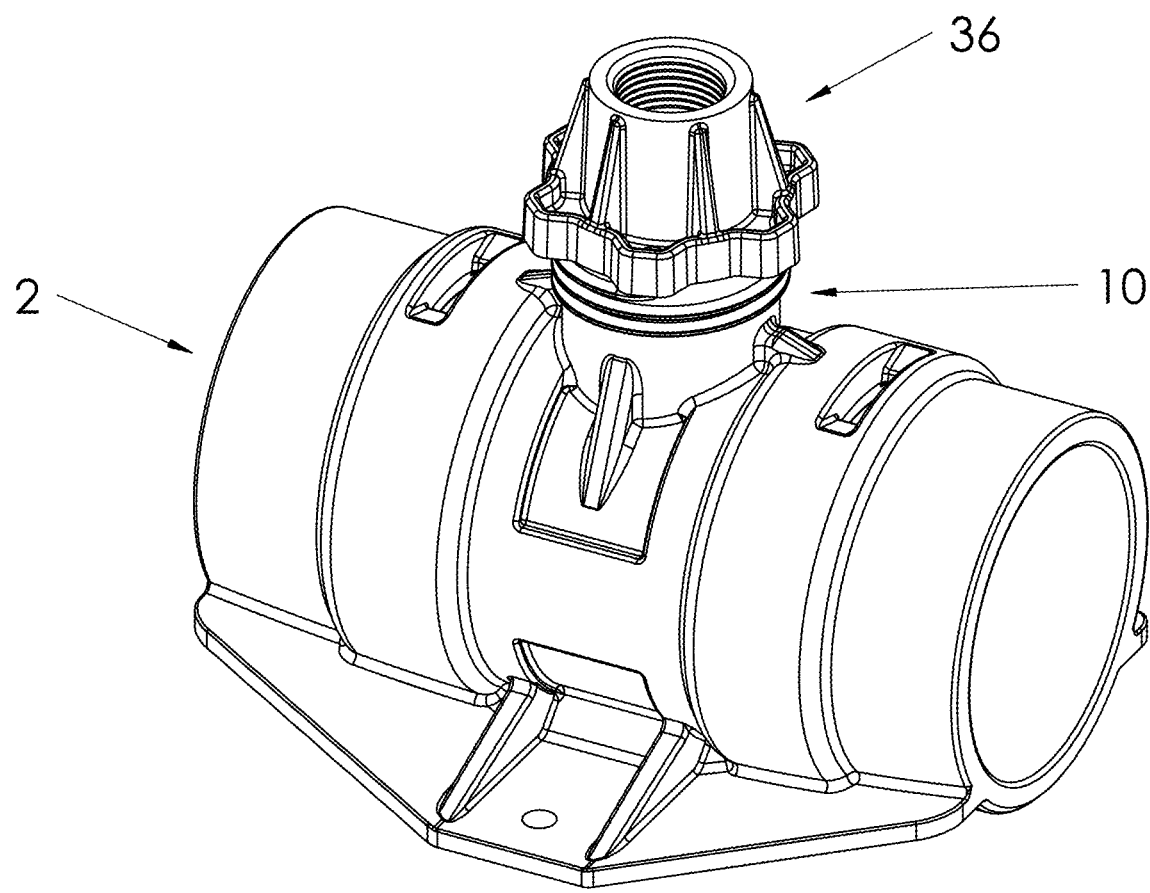
FIG. 7 illustrates an isometric view of a third embodiment of an irrigation saddle with a riser adapter and seal.

FIG. 7 illustrates an isometric view of a third embodiment of an irrigation saddle with a riser adapter 36 fully installed.

In this preferred embodiment, the riser adapter 36 is configured for threadedly engaging with the riser.

Figure 8:
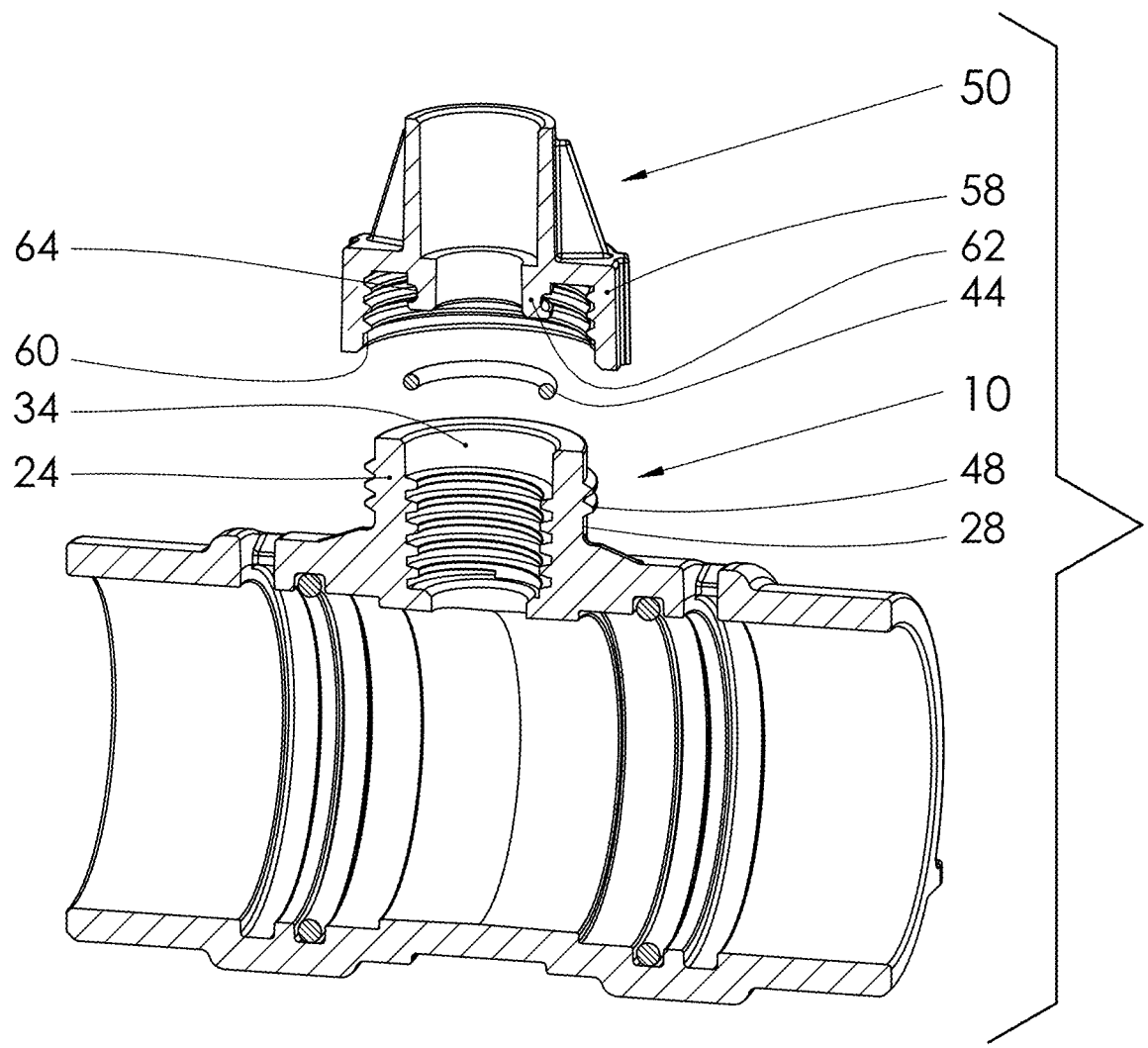
FIG. 8 illustrates an isometric cross-sectional view of a fourth embodiment of an irrigation saddle with a riser adapter and seal.

FIG. 8 illustrates an isometric cross-sectional view of a fourth embodiment of an irrigation saddle 10 with a cap-style riser adapter 50 and dynamic seal 44. In this preferred embodiment, the circular mount external annular face 28 also has external threads 48 for engagement with a cap-style riser adapter 50. The riser adapter 50 has a hollow main body that is cylindrical in shape with an annular flange 58. The annular flange 58 has internal threading 60 configured to releasably mount with the circular mount external threading 48. The riser adapter 50 has a hollow main body 62 with a circumferential channel 64 on the exterior face. The circumferential channel 64 is configured to mount a dynamic seal 44, preferably an O-ring. When the riser adapter 50 is threaded onto the saddle circular mount 24, the dynamic seal 44 radially seals against the internal annular sealing face 34.

Figure 9:
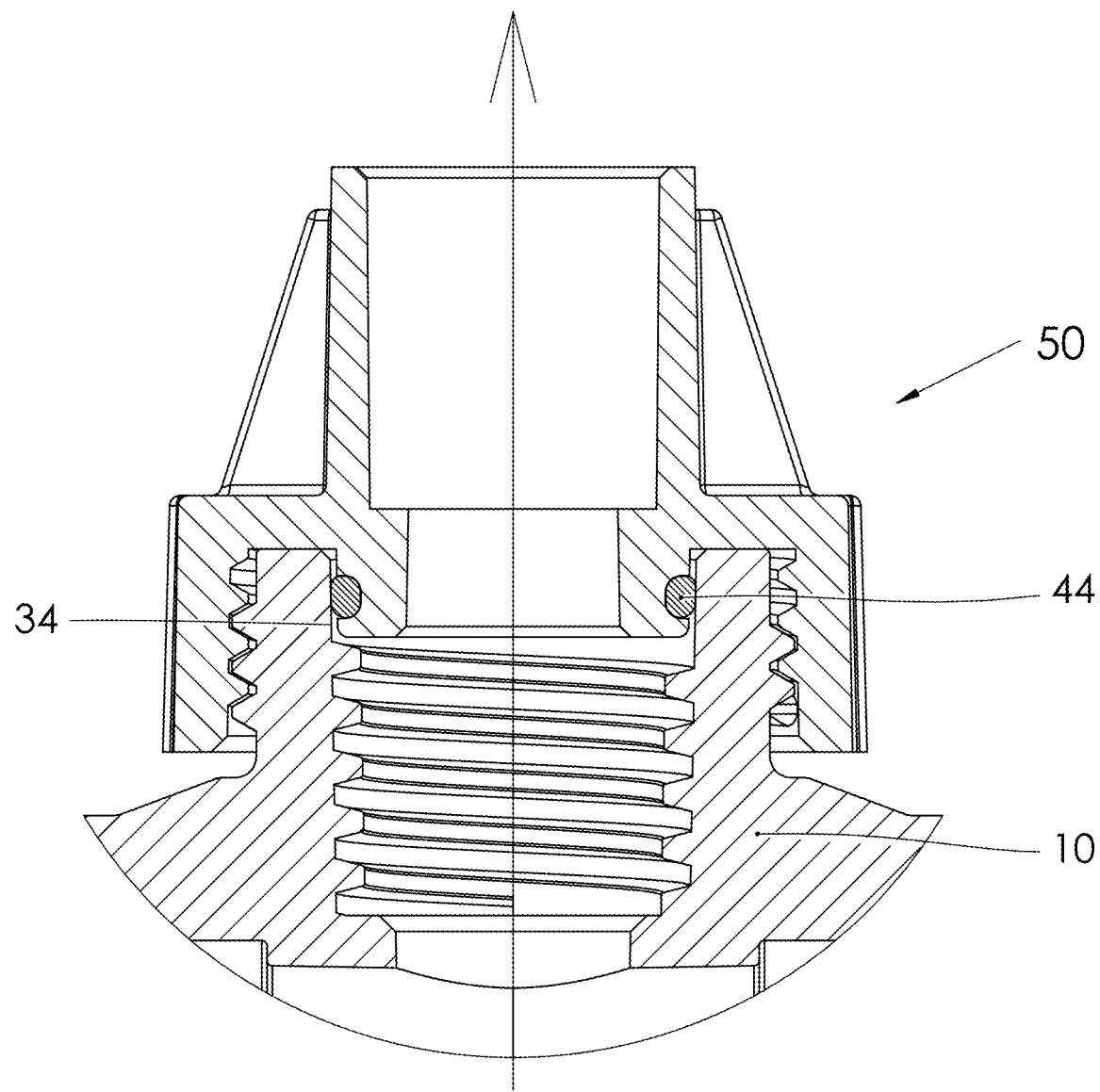
FIG. 9 illustrates a cross-sectional detail view of a fourth embodiment of an irrigation saddle with a riser adapter and seal.

FIG. 9 illustrates a cross-sectional detail view of a fourth embodiment of an irrigation saddle 10 with a riser adapter 50 and dynamic seal 44. The riser adapter 50 is fully installed and the dynamic seal 44 is positioned to radially seal against the annular sealing face 34.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

What is claimed is:

1. A pipe coupler comprising:
   a cylindrical tube having at least one open end configured for connection to an irrigation pipe system and an aperture in the a wall of the cylindrical tube at the top of said cylindrical tube;
   wherein said pipe coupler comprising a pipe coupler saddle at the top of said cylindrical tube at said aperture, said pipe coupler saddle comprising:
   a circular mount positioned above said aperture in the wall of said cylindrical tube, said aperture being in fluid communication with a central region of said saddle such that water may flow from the irrigation pipe system into the coupler and through the aperture, said circular mount having an internal annular face, an external annular face, and an end face positioned at a top of the circular mount, said internal annular face comprising threads spaced apart from said top of the circular mount such that an annular sealing face free of threads is positioned between said threads and said top of said circular mount, said threads are configured for threaded engagement of a riser adapter, wherein annular sealing face configured for sealing engagement with a dynamic seal of the riser adapter to seal between said riser adapter and said annular sealing face when water flows through said pipe coupler.

2. The pipe coupler of claim 1 wherein said saddle pipe coupler saddle is integral with said cylindrical tube.

3. The pipe coupler of claim 1 wherein said pipe coupler comprises a pipe coupler flange extending from the pipe coupler in a generally vertical direction and surrounding said aperture, wherein said pipe coupler saddle has a main saddle body with a generally tubular profile, wherein said pipe coupler saddle comprises a saddle flange surrounding said main saddle body, wherein said saddle flange is fixedly mounted to said pipe coupler flange.

4. The pipe coupler of claim 3 further comprising a seal between said pipe coupler saddle and said pipe coupler.

5. The pipe coupler of claim 1 wherein said external annular face comprises external threading configured for threaded engagement with internal threading of the flange of a riser adapter in the form of a cap.

* * * * *